(12) United States Patent
Edwards et al.

(10) Patent No.: US 11,488,166 B2
(45) Date of Patent: Nov. 1, 2022

(54) SYSTEM AND METHOD FOR BIOMETRIC HEARTRATE AUTHENTICATION

(71) Applicant: Capital One Services, LLC, McLean, VA (US)

(72) Inventors: Joshua Edwards, McLean, VA (US); Abdelkader M'Hamed Benkreira, McLean, VA (US); Kevan Emmott, McLean, VA (US); Michael Mossoba, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 111 days.

(21) Appl. No.: 16/238,296

(22) Filed: Jan. 2, 2019

(65) Prior Publication Data

US 2020/0213300 A1 Jul. 2, 2020

(51) Int. Cl.
*G06Q 20/40* (2012.01)
*H04L 9/40* (2022.01)

(52) U.S. Cl.
CPC ... *G06Q 20/40145* (2013.01); *H04L 63/0861* (2013.01)

(58) Field of Classification Search
CPC ............... H04L 63/0861; G06Q 20/40–49
USPC ........................................................ 705/67
See application file for complete search history.

(56) References Cited

U.S. PATENT DOCUMENTS

| | | | |
|---|---|---|---|
| 8,920,332 B2 | 12/2014 | Hong et al. | |
| 2011/0169603 A1* | 7/2011 | Fithian | G06Q 10/00 340/5.52 |
| 2012/0150052 A1* | 6/2012 | Buchheim | A61B 5/721 600/500 |
| 2014/0288390 A1* | 9/2014 | Hong | A61B 5/02438 600/301 |
| 2016/0203497 A1* | 7/2016 | Tietzen | G06Q 30/0201 705/14.27 |
| 2016/0373170 A1* | 12/2016 | Szini | H04B 7/0417 |

(Continued)

OTHER PUBLICATIONS

Zhao, T., et al.; "Poster: Your Heart Won't Lie: PPG-based Continuous Authentication on Wrist-worn Wearable Devices"; Poster Presentation; MobiCom 2018: The 24th Annual International Conference on Mobile Computing and Networking; Oct. 29-Nov. 2, 2018; pp. 783-785 (4 pgs); New Delhi, India.

(Continued)

*Primary Examiner* — Mohammad A. Nilforoush
*Assistant Examiner* — Cristina Owen Sherr
(74) *Attorney, Agent, or Firm* — KDB

(57) ABSTRACT

A biometric heartrate authentication system and method is disclosed that leverages heartrate information collected by heartrate tracking devices to build a heartrate profile for a client. The system further leverages location information collected by existing location information services to determine an activity profile for a client. The activity profile information may be used together with the heartrate profile to generate an expected heartrate range against which a cardholder heartrate may be compared for authentication purposes. Because client heartrate characteristics are generally unique, varying according to the unique activities being performed by the client at any point in time, the system and method thus provide a low cost, non-invasive method for reliably authenticating individuals and securing against fraudulent account accesses.

19 Claims, 10 Drawing Sheets

(56) References Cited

U.S. PATENT DOCUMENTS

| | | | | |
|---|---|---|---|---|
| 2016/0374567 A1* | 12/2016 | Breslow | ............... | A61B 5/721 |
| | | | | 600/301 |
| 2017/0220838 A1* | 8/2017 | He | ..................... | G06F 3/042 |
| 2017/0223017 A1* | 8/2017 | Kohli | ................. | H04L 63/0853 |
| 2017/0243195 A1* | 8/2017 | Xing | .................... | H04W 4/12 |

OTHER PUBLICATIONS

Savvas, A.; "Halifax Bank trials heart rate technology to authenticate customers", TechWorld.com; Mar. 16, 2015; 2 pages; URL: https://www.techworld.com/news/developers/halifax-bank-trials-heart-rate-technology-authenticate-customers-3601753/.

* cited by examiner

SYSTEM AND METHOD FOR BIOMETRIC HEARTRATE AUTHENTICATION

BACKGROUND

Debit and Credit cards are typically associated with currency accounts and may be used by account owners for transactions such as withdrawing funds or making purchases. Before the release of funds, the account owner is generally prompted to enter a password preferably known only to the account owners to secure the transaction.

A problem arises when debit and credit cards, and their associated passwords, are stolen by third parties who seek to impersonate and steal funds from the account owner. Because funds are released to any cardholder with the password, this authentication method cannot adequately protect against theft by impersonation.

Biometric authentication methods can overcome the problems associated with password-based authentication because authentication is performed based upon a physical attribute of the cardholder. For example, biometric authentication may be performed using one or more of a fingerprint, thumbprint, hand scan (e.g., palm print or back of hand), iris scan, retina scan, fingernail print, spoken password, voice print, voice (speech) recognition, image data, face topography data, facial recognition, DNA scan, etc., or combinations thereof. While these authentication techniques can greatly assist against identity theft, implementations of biometric solutions may increase the cost and complexity of transaction devices. In addition, authentication difficulties may arise due to customer misuse and/or equipment malfunction.

SUMMARY

According to one aspect, a method for authenticating accesses to accounts maintained by a service provider includes the steps of collecting heartrate information for a plurality of clients of the service provider, determining heartrate characteristics for each of the plurality of clients using heartrate information collected for each client, including determining a baseline heartrate and one or more exertion variances particular to each client and storing, in a data store, a heartrate profile for each client, the heartrate profile comprised of the heartrate characteristics particular to each client. The method includes the steps of receiving a request to authenticate access to an account maintained by the service provider, the request generated in response to a presentation by a cardholder of a token associated with the account at a transaction terminal, the request comprising a cardholder heartrate, retrieving a heartrate profile for a client associated with the account, retrieving an activity profile for the client associated with the account and selectively authenticating access to the account by the cardholder in response to the cardholder heartrate and the heartrate profile and the activity profile of the client, including determining whether the cardholder heartrate is within an expected client heartrate range.

According to another aspect, an authentication server for authenticating accesses to accounts maintained by a service provider includes a storage medium and a heartrate profile stored in the storage medium, the heartrate profile comprising, for each client of a plurality of clients having accounts maintained by the service provider, a baseline heartrate and one or more exertion variances particular to each client. The authentication server includes a transaction interface configured to receive a request to authenticate access to an account maintained by the service provider, the request generated in response to a presentation by a cardholder of a token associated with the account at a transaction terminal, the request comprising a cardholder heartrate. The authentication server includes a client interface configured to retrieve an activity profile for a client associated with the account in response to the request. The authentication server further includes a processing device, coupled to the memory, the transaction interface and the client interface, the processing device configured to selectively authenticate the access to the account by the cardholder in response to the cardholder heartrate, the heartrate profile of the client and the activity profile of the client to determine whether the cardholder heartrate is within an expected client heartrate range.

According to a further aspect, a method for authenticating accesses to accounts maintained by a service provider includes the step of receiving a request to authenticate an access to an account maintained by the service provider, the request generated in response to a presentation by a cardholder of a token associated with the account at a transaction terminal, the request comprising a cardholder heartrate. The method includes retrieving a heartrate profile for a client associated with the account, the heartrate profile comprising heartrate characteristics including a baseline heartrate, one or more exertion variances particular to the client, and at least one recovery period associated with at least one exertion variance, wherein each exertion variance is associated with an exertion level resulting in a change in heartrate over the corresponding baseline and retrieving an activity profile of the client associated with the account, the activity profile of the client comprising a plurality of location information related to a location of the client during a corresponding plurality of time intervals and used to determine a rate of travel of the client. The method includes the step of determining an expected client heartrate range in response to the baseline heartrate of the client and the expected variance associated with the exertion level corresponding to the rate of travel of the client, including in response to the recovery period associated with the expected variance and selectively authenticating access to the account by the cardholder in response to the cardholder heartrate and the expected client heartrate range.

With such an arrangement, information generated by existing heartrate capture devices may advantageously be leveraged by cardholder authentication services to provide a low cost, non-invasive cardholder authentication solution for transaction devices such as Automatic Teller Machine(s) and merchant card readers.

DEFINITIONS

Figure 1:
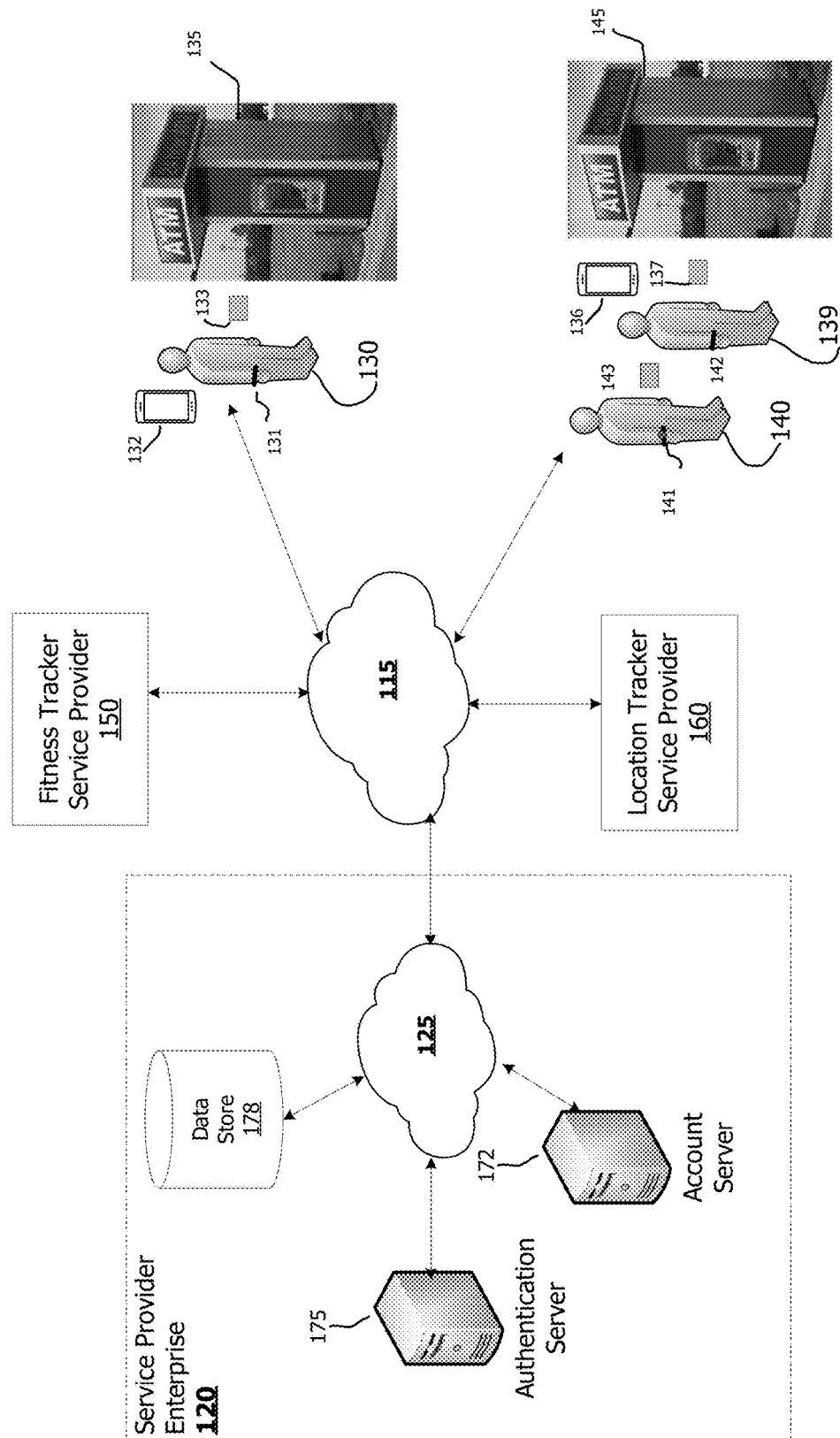
FIG. 1 is a block diagram of an exemplary embodiment of a currency network adapted to support a biometric heartrate authentication method of the invention.

As used herein, unless specifically indicated otherwise, the word "or" is used in the inclusive sense of "and/or" and not the exclusive sense of "either/or."

Any issued U.S. Patents, allowed applications, published foreign applications, and references that are cited herein are hereby incorporated by reference to the same extent as if each was specifically and individually indicated to be incorporated by reference.

In order for the present invention to be more readily understood, certain terms are first defined below. Additional definitions are set forth throughout the specification.

Cardholder means an individual that initiates a transaction with a transaction device to access, transfer or otherwise modify an account by passing a token associated with the account to the transaction device. The token may be hard-coded into a physical card (such as a debit or credit card) that is forwarded to the transaction device by inserting the card into, holding the card proximate to, or swiping the card through, the transaction device. Alternatively, the token may be stored on a fob or wireless communication device, such as a cellular phone, and transmitted to the transaction device as part of an authentication protocol. Accordingly, it is not required that a cardholder uses a physical card for token exchange.

Client means a registered owner of an account maintained by a service provider.

Heartrate Monitoring Device means any device that is configured to read a heartrate of an individual including but not limited to fitness devices such as a Fitbit Charge™, FitBit Versa™, Fitbit Alta HR™, Garmin™ Vioactive® HR, Garmin™ Vivosmart®, Garmin™ Forerunner®, Apple® Watch, etc. The term "Heartrate Monitoring Device" may be used herein interchangeably with "fitness tracking device."

Transaction Device means any device that is configured to access, transfer or otherwise modify a client account, including but not limited to an Automatic Teller Machines (ATM) and merchant card reader.

DETAILED DESCRIPTION

A biometric heartrate authentication system and method leverage heartrate information collected by heartrate tracking devices to build a heartrate profile for a client. In one embodiment the heartrate profile may include heartrate characteristics that are personal to the client, including but not limited to a baseline heartrate, heartrate variations based on client exertions and baseline heartrate recovery profiles. The system further leverages location information collected by existing location information services to determine an activity profile for a client. The activity profile may include information related to a client's heartrate under various modes of transportation. The activity information may be used together with the heartrate profile to generate an expected heartrate range against which a cardholder heartrate may be compared for authentication purposes. According to one aspect, the expected heartrate may be modified in accordance with recovery patterns of the client. Because client heartrate characteristics are generally unique, varying according to the unique activities being performed by the client at any point in time, the system and method thus provide a low cost, non-invasive method for reliably authenticating individuals and securing against fraudulent account accesses.

These and other features of the invention will now be described with reference to the figures, wherein like reference numerals are used to refer to like elements throughout.

As used in this application, the terms "system," "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 1 illustrates a system 100 including one or more client devices including cellular phones 132, 136 coupled to enterprise service provider 120 via a network 115 and enterprise network 125. Cellular phone 132 and cellular phone 136 may also be coupled to other service providers, such as fitness tracker service provider 150 and location tracker service provider 160. According to one aspect, the cellular phones 132, 136 comprise network-enabled computers and communicate with the various service providers to access service provider content and services.

As referred to herein, client devices are not limited to cellular phones, but may include any network-enabled computer including, but is not limited to: e.g., a mobile device, a phone, a 'smart' watch, a handheld PC, a personal digital assistant (PDA), an iPhone, iPod, iPad from Apple® or any other mobile device running Apple's iOS operating system, any device running Microsoft's Windows® Mobile operating system, and/or any other smartphone or like wearable mobile device, such as an Apple® watch or a Garmin® device.

In the embodiment of FIG. 1, client devices are shown as a cellular phone, while client device 141 represents as 'smart' watch.

Client devices may include a plurality of thin client applications specifically adapted for communication with the various service providers 120, 150 and 160. The thin client applications may be stored in a memory of the client device and be operable when executed upon by the client device to control an interface between the client device and the respective service provider application, permitting a user at the client device to access service provider content and services.

According to one aspect, the thin client applications are adapted to exchange information. For example, in one embodiment, the thin client application associated with the service provider 120 may communicate with the thin client application associated the fitness tracker service provider 150 to collect heartrate information for the client. The thin client application associated with the service provide 120 may also communicate with the thin client of the location tracker service provider 160 to collect activity information for the client. The collected heartrate information may then be combined with the activity information for use during biometric heartrate authentication as described in more detail below.

In some examples, network 115 may be one or more of a wireless network, a wired network or any combination of wireless network and wired network and may be configured to connect client devices such as cellular phones 132, 136 or smart watch 141, 142 to service provider 120. For example, network 115 may include one or more of a fiber optics network, a passive optical network, a cable network, an Internet network, a satellite network, a wireless local area network (LAN), a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

It should be appreciated that according to one or more examples, network 115 may be part of a plurality of interconnected networks, such as, for example, the Internet, a service provider's enterprise network 125, a cable television network, corporate networks, such as credit card association networks, and home networks.

Service providers 120, 150 and 160 are, in one embodiment, associated with businesses providing computer-based services to clients over a network 115. Almost all modern service providers use the Internet to provide service offerings to potential consumers. The service offerings are generally provided in the form of software applications which operate using dedicated resources of the service provider. The combination of the software and hardware that provides a particular service to a client is referred to herein as a 'server'. The servers may communicate over public networks 115, or private networks such as enterprise network 125. Private networks of a service provider are often referred to as a corporate or enterprise network. The enterprise network 125 may comprise a wireless network, a wired network or any combination of wireless network and wired network as described above with regard to network 115.

In the system of FIG. 1, service provider 120 is shown to include an account server 172 and an authentication server 175. Although each server and/or data store are illustrated as a discrete device, it is appreciated that the servers and data may be comprised of multiple devices distributed throughout the enterprise or, in the case of distributed resources such as 'cloud' resources, throughout the network 115. The account server 172 may support account management services. The authentication server 175 may work cooperatively with the account server to control access to the accounts managed by the account server.

The data store 178 comprises data storage resources that may be used, for example, to store customer account, credential and other authentication information for use by the account server 172 and the authentication server 175. The data store 178 may be comprised of coupled data resources comprising any combination of local storage, distributed data center storage or cloud-based storage.

According to one aspect, the biometric heartrate authentication methods disclosed herein may be advantageously used to authenticate transactions at transaction devices such as Automatic Teller Machine (ATM) 135 and ATM 145. In particular, heartrate and activity information maintained by the applications of both the fitness tracker service provider 150 and the location tracker service provider may be shared with the authentication server to authenticate ATM transactions.

When cardholders, such as cardholder 130, cardholder 139 and cardholder 140 seek access to an account, they present their tokens (token 133, token 137 and token 143, respectively) to the ATMs 135, 145. A captured cardholder heartrate is forwarded from the cardholder's client device (132, 141) to the authentication server 175. The heartrate may be captured by a fitness device, such as fitness devices 131 and 142 which may be devices such as Fitbit® wristbands configured to record heartrate and transfer heartrate to a coupled client device, such as a cellular phone 132, 136 using Bluetooth communications protocols. Alternatively, the heartrate may be captured by a smart watch such as smart watch 141, upon which executes the applications enabling communication with service providers 120, 150 and 160. Location information for a client may also be retrieved from client devices such as cellular phones 132, 136 or smart watch 141 and forwarded to authentication server 175 for authentication purposes.

According to one aspect, it is realized that the heartrate profile for a client when viewed in combination with an activity profile of the client may provide a non-invasive, fool-proof, unique point in time identifier of the client that is resistant to fraudulent attack. Tracking the activity of the client that is registered to the account, using this activity to determine a mode of transport of the client and an expected deviation from the client's baseline heartrate and comparing the expected heartrate to a heartrate of a cardholder recorded by the transaction device forecloses the ability of malicious individuals to easily impersonate a client.

Figure 2:
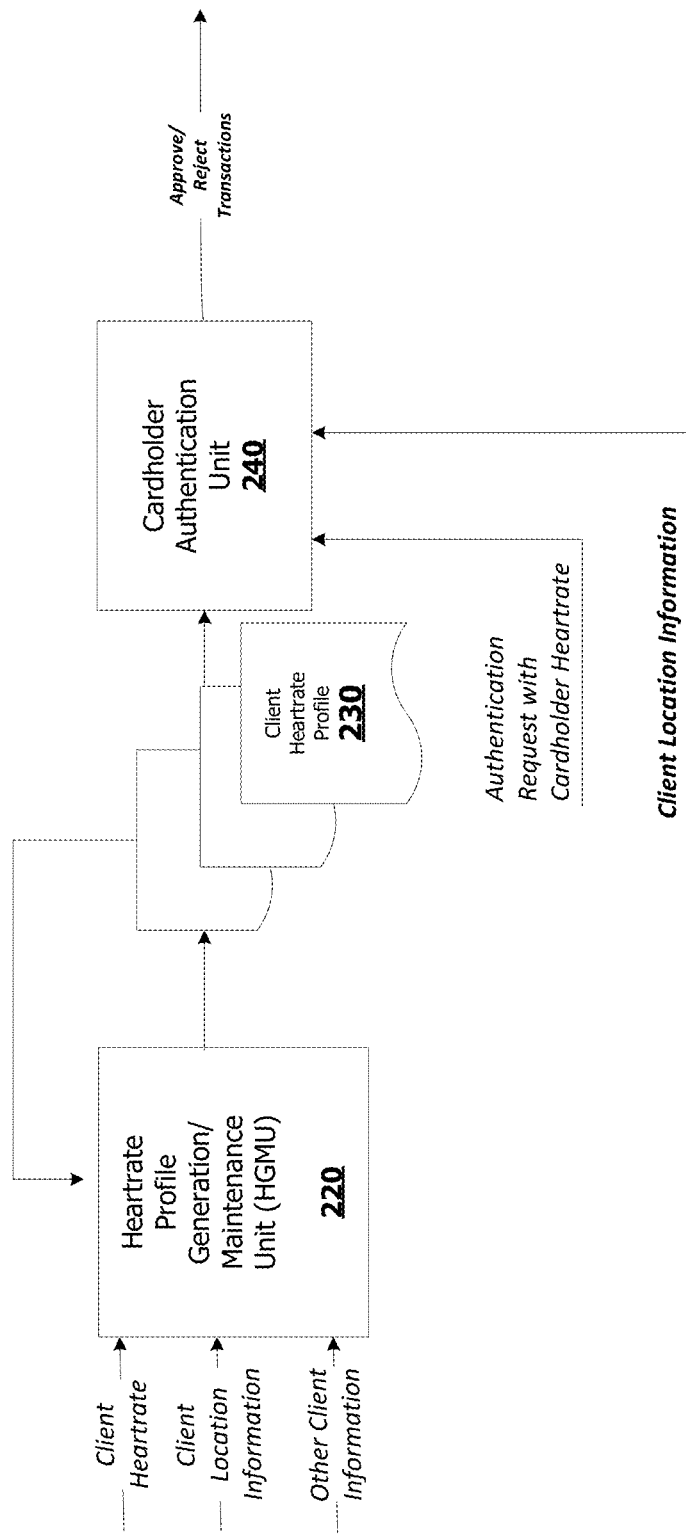
FIG. 2 is a high-level block diagram of various components of one embodiment of a biometric heartrate authentication system of the invention.

Referring now to FIG. 2, a high-level block diagram of exemplary components of the authentication service 200 is shown to include a Heartrate Profile Generation/Maintenance Unit (HGMU) 220 and a cardholder authentication unit 240. In one embodiment, the HGMU 220 operates to build and maintain a heartrate profile for a client. As will be described in more detail herein, over time a client's heartrate profile may vary based on life events of the client such as stress, weight, fitness, etc. In one embodiment, the heartrate profile may be initially generated by collecting heartrate information over a fixed period of time and using the heartrate information to build a client heartrate profile. The fixed period of time is a matter of design choice and may range, by way of example, from between one week and one month. Heartrate information may be sampled at a predetermined frequency, such as daily, every few days, once a week, etc. The heartrate information may be analyzed to identify characteristics of the client heartrate, including a baseline heartrate and heartrate variations in response to exertion levels.

The HGMU 220 may also receive client location information. In one aspect, the client location information is used together with the client heartrate information to build the heartrate profile. Client location information may be used together with heartrate information to infer modes of client transport, including walking, jogging, biking, driving, bus or train travel, etc. Determining modes of transport of a client may involve periodically sampling client location and calculating a rate of travel between samples to build an activity timeline. Determining modes of transport may further comprise apportioning the activity timeline into a plurality of discrete activity intervals based on the rates of travel and other client location information. For example, the client may be travelling during one activity interval at 6 mph, and during a second activity period at 45 mph. Modes of transport may be inferred from a combination of the rate of speed and the heartrate information; for example, it is known that a human cannot travel at 45 mph for any appreciable distance without technological assistance such as a bike, car or train.

In one embodiment, client heartrates are mapped to the activity periods. Over time a unique profile for a client may be constructed that encompasses a variety of activities and/or modes of transportation of the client and associated expected exertion heartrate ranges for each activity/mode of transportation.

In some embodiments the HGMU 220 may also use other client location information to infer modes of transportation, including client locations at the point in time activity start and endpoints. For example, during one point in time activity, a client may travel 35 mph, suggesting automobile transport. However, if the point in time activity origin and termination are proximate to bus stops, the mode of transport is inferred to be by bus.

Other client information that may be considered when determining mode of transport may comprise, for example, activity information input by a client into the fitness tracker, or travel information that may be extracted from client calendar or travel applications.

In some embodiments, the frequency of sampling may correlate to operations of the fitness tracking application, for example, sampling heartrate information before it is overwritten by new information by the client device.

As part of building the client heartrate profile, the Heartrate Profile Generation/Maintenance Unit (HGMU) 220 may apportion the heartrate information based on values, and attribute groups of heartrate values to exertion levels associated with modes of transport and exertion of varying intensities. As described above, many applications permit a client to input a mode of transport (such as biking, running) during a particular activity and HGMU 220 may use the inputted information to associate the activity with an exertion level. In other embodiments, the HGMU may infer the mode of transport, for example with reference to activity information received from the location tracker service provider 160. In one embodiment, the activity information may be used in conjunction with the location information to determine a rate of speed of the client, to attribute activity or mode of transport to the client based on the rate of speed and heartrate profile of the client at particular points in time. For example, a client traveling 13 mph with a resting heartrate may be traveling in a car, while a client traveling 13 mph with an elevated heartrate may be cycling, which would raise the heartrate. The HGMU may be implemented as a combination of hardware and software capable of performing such analysis, and portions may be implemented as a machine-learning model capable trained to recognize activity patterns from a combination of heartrate and location information as described above.

Table 1 illustrates an exemplary entry of a heartrate profile that may be generated for a client, including a client identifier, a baseline heartrate and a plurality of activity levels. Associated with each activity level is a range of heartrates, and a recovery time, where the recovery time is associated with the usual time for a client's heartrate to return to baseline following exertion at the associated activity level. Although discrete numbers are provided in Table 1 for the recovery time, it is appreciated that recovery of a client may follow a pattern, including linear, curved, random, or another pattern particular to the client. As will be described in more detail below, the recovery time or pattern may be used in conjunction with the heartrate and activity information when determining whether a captured heartrate corresponds to an expected heartrate for authentication purposes.

It should be noted that the number and granularity of activity levels provided in a client heartrate profile may vary depending upon a number of factors including but not limited to the quality of heartrate and location data retrieved for the client and the available resources of the service provider 120 for storing client information. Advantageously in some embodiments different modes of transport may be associated with different activity levels.

TABLE I

| Client ID | | Doe, John |
|---|---|---|
| Baseline Heartrate | | 63 |
| Activity Level | Exertion Variance | Recovery Period |
| 0 | 0 | 0 |
| 1 | +15-+29 | 1 min |
| 2 | +30-+39 | 3 min |
| 3 | +40-+59 | 4 min |
| 4 | +60-+100 | 5 min |

The heartrate profiles 230 may be stored in data store 178 and retrieved by the cardholder authentication unit 240 from data store 178 upon receipt of an authentication request from a cardholder client device. As will be described in more detail with regard to FIG. 6, the authentication request advantageously comprises the cardholder heartrate. The cardholder authentication unit 240 analyzes the cardholder heartrate in view of retrieved client location information and the client heartrate profile 230 to either approve or reject the access request.

Figure 3:
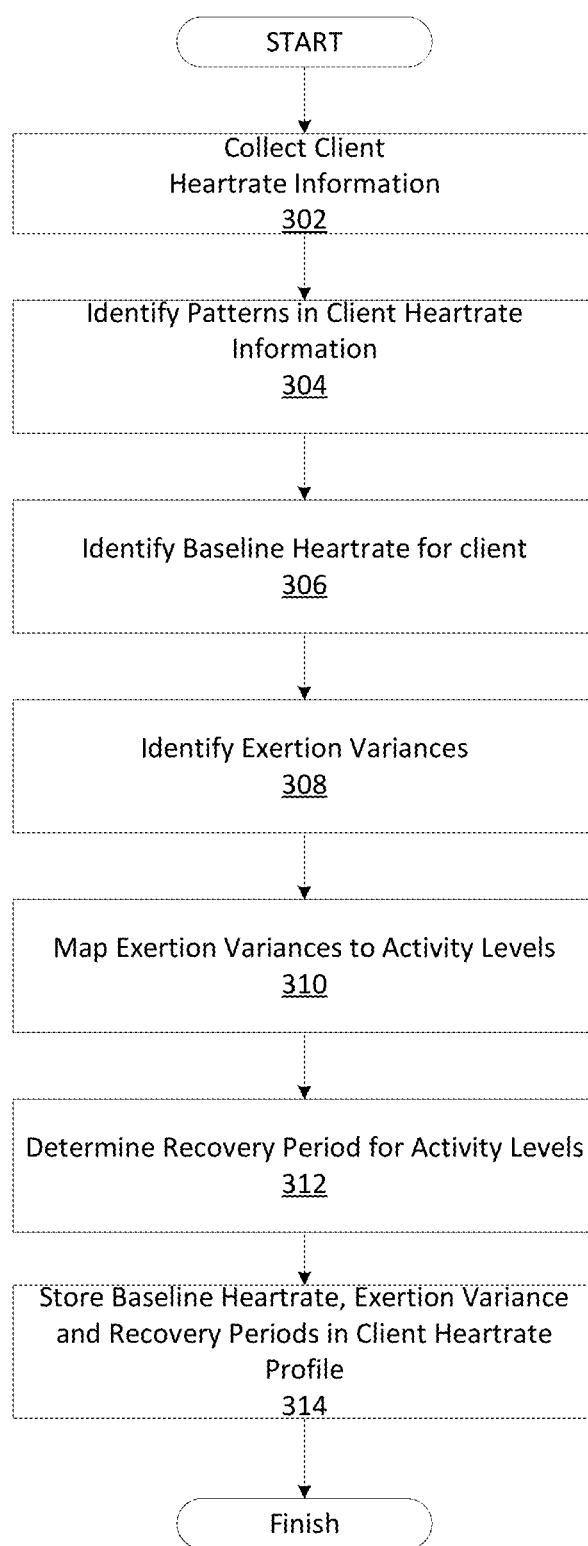
FIG. 3 is a flow diagram illustrating exemplary steps that maybe performed in one embodiment to build a heartrate profile that may be used in the system of FIG. 1.

FIG. 3 is flow diagram illustrating exemplary steps of a heartrate profile build process 300 that may be performed by an account server 172 to provide a heartrate profile such as that shown in Table I. At step 302 the application server collects the client heartrate information. As mentioned above, the client heartrate information may be collected from a fitness tracker application. In some embodiments, the fitness tracker application collects heartrate information obtained by a device in physical contact with the client, for example from a band worn on a wrist of a client or around a chest of a client. The authentication server 172 may periodically retrieve heartrate information for use in generating the heartrate profile.

At step 304 the authentication server analyzes the heartrate information to identify patterns and to associate the patterns with modes of transport and activity levels. As mentioned above, this analysis may be performed via a combination of hardware or software, or, for example, using a machine-learning model that is trained to identify heartrate patterns and associate the heartrate patterns with modes of transportation and/or other activities. At step 306, the account server may identify the baseline heartrate. In one embodiment, at step 308 the heartrate information is apportioned into exertion variance ranges, and at step 310 the exertion variance ranges are mapped to activity levels. At step 312, the heartrate information is further analyzed to identify recovery periods or patterns related to the manner in which a client's heartrate returns to baseline following exertion. At step 314 the recovery information is also written to the heartrate profile, and the process is complete. The process 300 may advantageously be re-executed periodically, for example on a daily, weekly, monthly or another basis to ensure currency of the heartrate profile for each client.

Figure 4B:
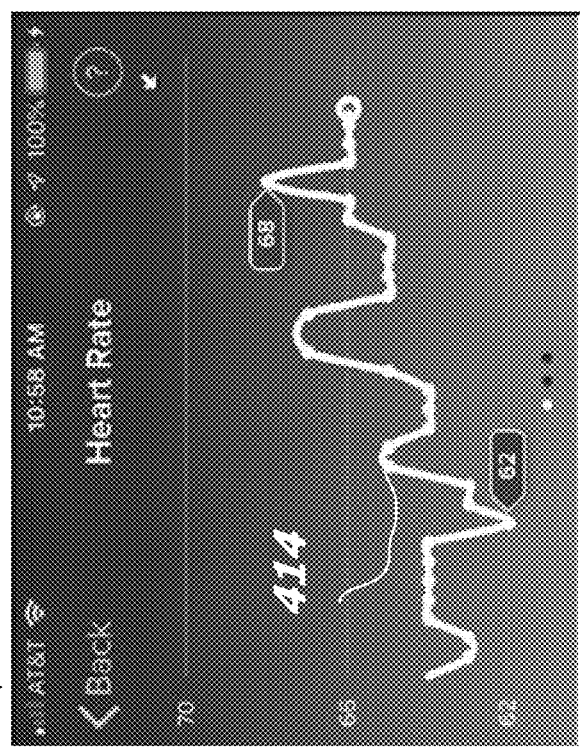
FIGS. 4A and 4B illustrate exemplary heartrate information that may be collected for use by the process of FIG. 4.
Figure 4A:

FIG. 4A illustrates an exemplary display 402 of daily heartrate information 412 that may be collected by the HGMU as part of generating and maintaining the heartrate profile for the client. As shown in FIG. 4A, a client heartrate may vary throughout the day depending upon the activity level of the client. In some embodiments such as that of FIG. 4A, the fitness tracker apportions heartrates into zones, including resting, fat burn, cardio, and peak. The zones may vary based on characteristics of the client whose heartrate is being recorded, such as the weight, age, and sex of the client. In some embodiments, the account server may use the activity levels and ranges identified by the fitness tracker service. In other embodiments, the account server may apportion the heartrate information into different granularities, in accordance with design considerations of the account server.

FIG. 4B illustrates another display screen 404 provided by a fitness tracking service, where the display screen 404 includes a graph 414 illustrating the changes to a client's resting heartrate over time. In one embodiment, an account server may monitor the changes to the resting heartrate of the client. When changes to the resting heartrate of the client exceed an allowable threshold for a pre-determined time period, re-generation of a heartrate profile for the client may be triggered. The allowable threshold is a matter of design choice, and may include, for example, a +/−1, 2, 3, 4 delta in a client's baseline heartrate. The predetermined time period may comprise sufficient time to filter out anomalies but capture changes, for example multiple days or a week.

Figure 5:
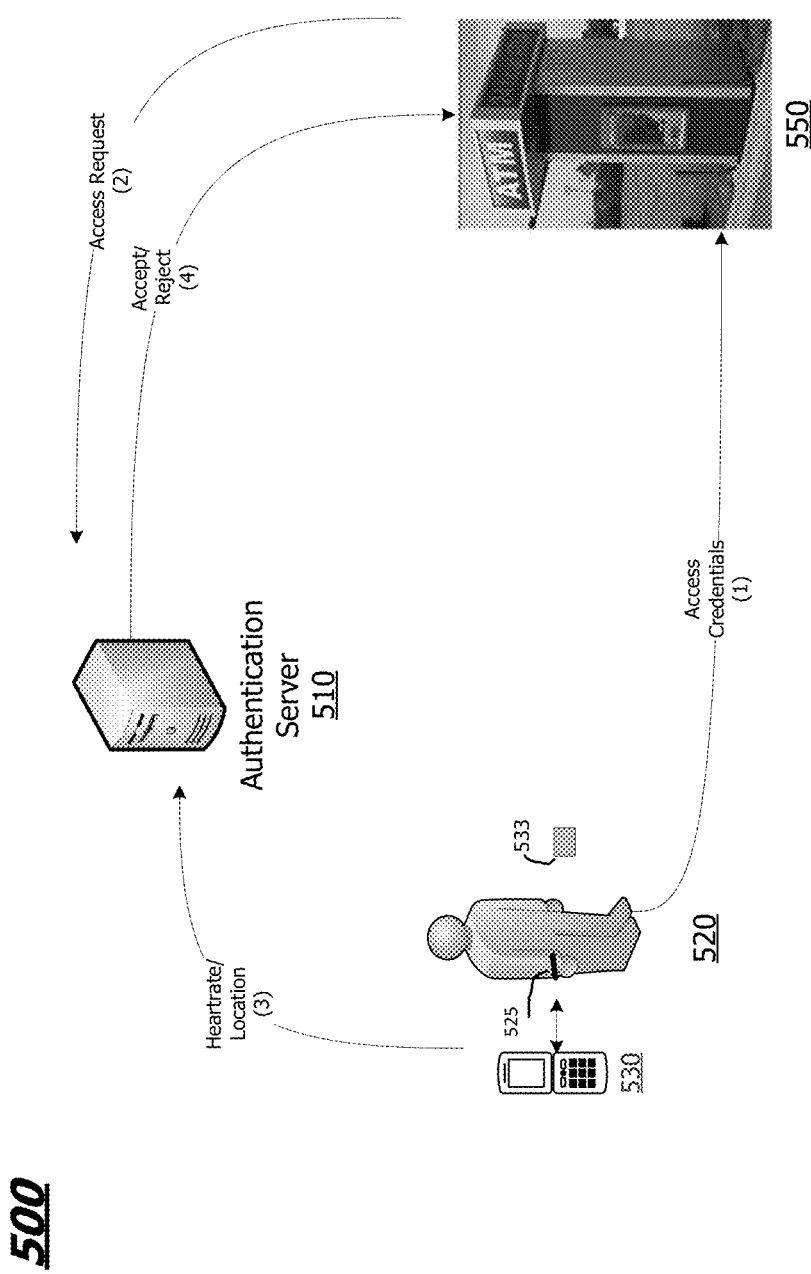
FIG. 5 is a simplified network diagram used to visually depict one example of a communication flow during a biometric heartrate authentication process of the invention.

FIG. 5 is a block diagram 500 provided to illustrate a communication flow of information between a cardholder 520, an authentication server 510, and a transaction device 550 during access request authentication. In one embodiment, cardholder 520 presents a token in the form of a card 533 to the transaction device 550. The cardholder may also input a password enabling access to an account associated with the card. As described in the background, such password authentication is often inadequate for securing transactions against malicious actors seeking to perform fraudulent ATM transactions.

Accordingly, client heartrate information is collected throughout a client's day. When the cardholder presents an authentication token to a transaction device such as an ATM, the current cardholder heartrate is captured and forwarded to the authentication server. It should be noted that the cardholder heartrate may continue to be captured throughout the transaction.

In the embodiment of FIG. 5, heartrate authentication initiates by capturing a heartrate of the cardholder. The heartrate may be captured by fitness tracking device 525 and transferred to authentication server 510 via client device 530. In addition, location information may also be extracted from an application of a location tracking service operating on the client device and forwarded to the authentication server 510. In one embodiment, the authentication server may validate the location of a client device as proximate to the transaction device 550.

In such an embodiment, the access request is also forwarded to the authentication server 510. The authentication server matches the request with the newly captured heartrate information and location information to determine whether the captured cardholder heartrate is within an expected range, sending an approval or rejection to transaction device 550.

Figure 6:
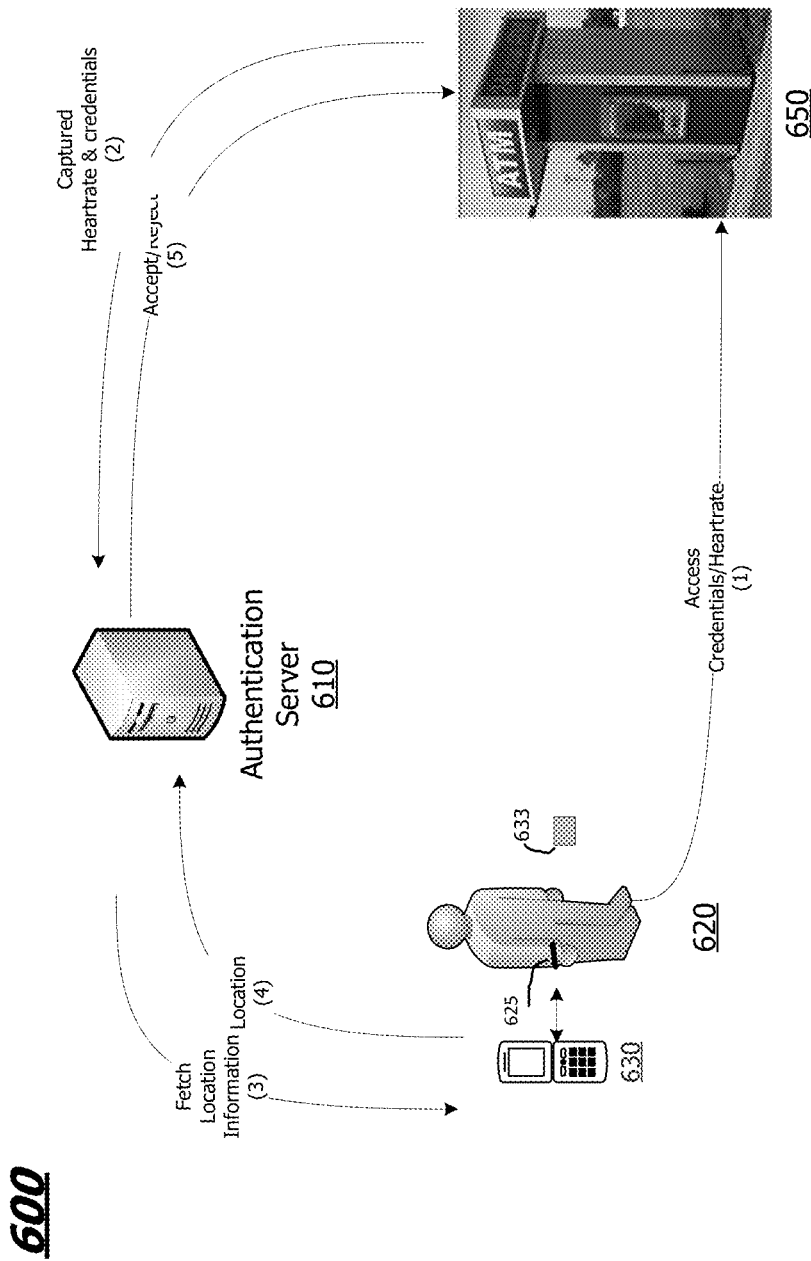
FIG. 6 a simplified network diagram used to visually depict another example of a communication flow during a biometric heartrate authentication process of the invention.

FIG. 6 illustrates another embodiment of a communication flow 600 for biometric heartrate authentication. When a cardholder 620 presents a token using card 633 to the transaction device 650, the cardholder heartrate is read from activity tracker 625 by the fitness tracker application and captured by the transaction device. This may occur, for example, in response to the cardholder synchronizes their client device to the transaction device, to enable the transaction device to extract heartrate information from the fitness tracker.

The captured credentials and heartrate are forwarded to the authentication server 610. In one embodiment, the authentication server then retrieves the client heartrate profile associated with the account that is being accessed by the request and may forward a fetch request for activity information to a client device registered for use in heartrate authentication by the owner of the account. For example, the authentication server may forward the request to an address of a registered cell phone, to extract activity information from the registered cell phone. The location information may then be retrieved from the registered device and forwarded to the authentication server 610, which selectively accepts or rejects the transaction in response to the captured heartrate, client heartrate profile and activity information of the registered client device.

Figure 7:
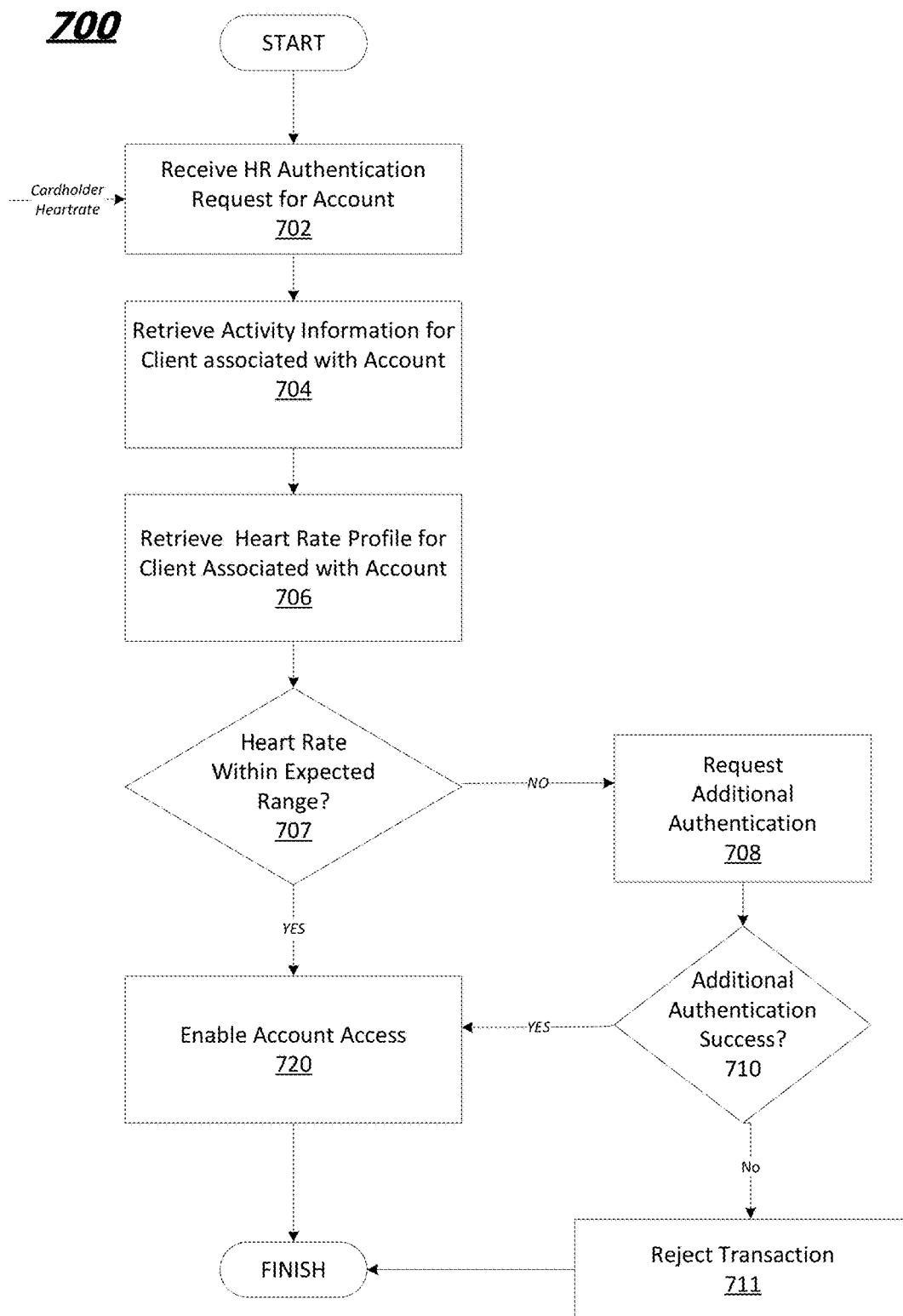
FIG. 7 is a flow diagram illustrating exemplary steps that may be performed during a biometric heartrate authentication process of FIG. 5 or FIG. 6.

FIG. 7 is a flow diagram of an exemplary process 700 for performing heartrate authentication. At step 702 access authentication request is received by the authentication server. The authentication server also receives a cardholder heartrate. At step 704, the authentication server retrieves activity information from the client associated with the account, at step 706 retrieves a heartrate profile for the client associated with the account. At step 707, the authentication server analyzes the activity information to identify an activity level of the client to determine an exertion variance for the activity level and a concomitant expected heartrate. When determining the expected heartrate, the authentication server may also examine the activity information to adjust the heartrate in accordance with a recovery period or pattern of the client. For example, referring briefly to FIG. 1, activity information of cardholder 140 may show high levels of exertion prior to his use of the ATM 145. However, if the cardholder 140 arrives after cardholder 139 and waits to use the ATM 145, then cardholder's heartrate will start to return to his baseline heartrate in accordance with the recovery pattern of the activity level.

In one embodiment, the expected heartrate may comprise a range of heartrates, and if the cardholder heartrate falls within the range of heartrates, it is said to correspond to the expected heartrate. For example, in an embodiment where the range of heartrates is +/− two beats per minute, a cardholder heartrate is read as 66 beats per minute (bpm), and an expected heartrate is 64 beats per minute, then the cardholder heartrate is said to correspond to the expected heartrate. In the same example, if the cardholder heartrate is 68 beats per minute, the cardholder heartrate is inconsistent with the expected heartrate, and authentication is rejected.

Referring to FIG. 7, if the cardholder heartrate corresponds to the expected heartrate range at step 707, then at step 720 the client is authenticated, and account access is enabled. If, however, at step 707 there is not a correspondence between the expected heartrate and the cardholder heartrate, at step 708 additional authentication may be requested. Such authentication may include, for example, query/response tests, additional passcodes or other biometric screening tests. If at step 710 the authentication server is unable to authenticate the cardholder, then at step 711 the transaction is rejected. If, however, at step 710 the authentication server can authenticate the cardholder via these alternate tests, then at step 720 the client is authenticated.

Figure 8A:
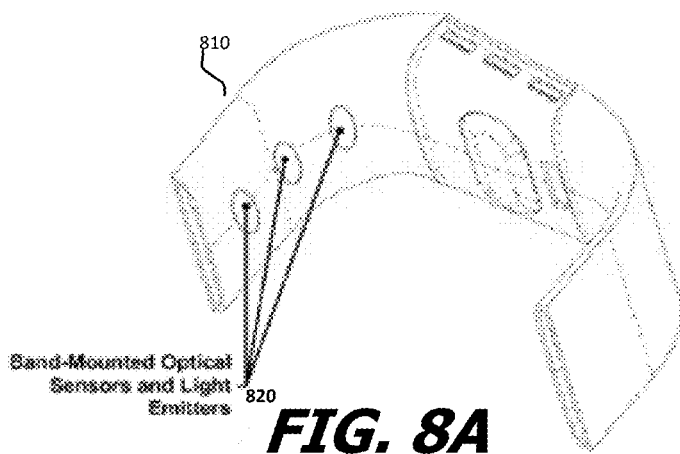
FIG. 8A and FIG. 8B are perspective diagrams illustrating exemplary components of a wearable heartrate capture device that may be used to collect heartrate information for by the process of FIG. 3.
Figure 8B:
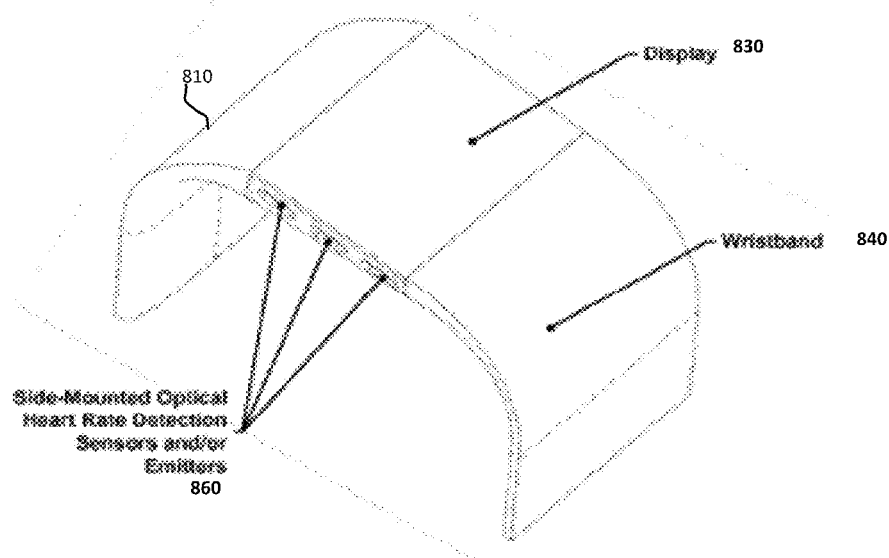

FIG. 8A and FIG. 8B are perspective views of one embodiment of a fitness tracking device that may be worn on a wrist to capture heartrate information as described in U.S. Pat. No. 8,920,332, issued Dec. 30, 2014, and assigned to Fitbit, Inc, incorporated herein by reference. The fitness tracking device 810 includes a wristband 840 having mounted therein a plurality of band-mounted optical sensors and light emitters 820 and a plurality of side-mounted optical heart rate detection sensors and/or emitters 860, which together are capable of capturing heartrate information when in proximate contact with a client's skin. The fitness tracking device 810 may further include a display 830 for providing information to the client, such as number of steps, heartrate, messages and the like.

Portable biometric monitoring devices such as the fitness tracking device 810 may collect one or more types of physiological and/or environmental data from embedded sensors and/or external devices and communicate or relay such information to other devices, including devices capable of serving as an Internet-accessible data sources, thus permitting the collected data to be viewed, for example, using a web browser or network-based application. For example, while the user is wearing a biometric monitoring device, the biometric monitoring device may calculate and store the user's heartrate using one or more biometric sensors. The biometric monitoring device may then transmit data representative of the user's step count to an account on a service provider web site, computer, mobile phone, or health station where the data may be stored, processed, and visualized by the user.

Biometric monitoring such as fitness tracking device 810 may use one, some or all the following sensors to acquire physiological data, including, but not limited to, the physiological data outlined in the table below. All combinations and permutations of physiological sensors and/or physiological data are intended to fall within the scope of this disclosure. Biometric monitoring devices may include but are not limited to types of one, some, or all the sensors specified below for the acquisition of corresponding physiological data; indeed, other type(s) of sensors may also or alternatively be employed to acquire the corresponding physiological data, and such other types of sensors are also intended to fall within the scope of the present disclosure. Additionally, the biometric monitoring device may derive the physiological data from the corresponding sensor output data, including but is not limited to the number or types of physiological data that it could derive from said sensor.

In one example embodiment, the biometric monitoring device may include an optical sensor to detect, sense, sample and/or generate data that may be used to determine information representative of, for example, stress (or level thereof), blood pressure, and/or heart rate of a user. In such embodiments, the biometric monitoring device may include an optical sensor having one or more light sources (LED, laser, etc.) to emit or output light into the user's body, as well as light detectors (photodiodes, phototransistors, etc.) to sample, measure and/or detect a response or reflection of such light from the user's body and provide data used to determine data that is representative of stress (or level thereof), blood pressure, and/or heart rate of a user (e.g., such as by using photoplethysmography).

In one embodiment, a biometric monitoring device may employ data (for example, from one or more motion sensors) indicative of user activity or motion to adjust or modify characteristics of triggering, acquiring, and/or obtaining desired heart rate measurements or data (for example, to improve robustness to motion artifact). For instance, if the biometric monitoring device receives data indicative of user activity or motion, the biometric monitoring device may adjust or modify the sampling rate and/or resolution mode of sensors used to acquire heart rate data (for example, where the amount of user motion exceeds a certain threshold, the biometric monitoring device may increase the sampling rate and/or increase the sampling resolution mode of sensors employed to acquire heart rate measurement or data.) Moreover, the biometric monitoring device may adjust or modify the sampling rate and/or resolution mode of the motion sensor(s) during such periods of user activity or motion (for example, periods where the amount of user motion exceeds a certain threshold). In this way, when the biometric monitoring device determines or detects such user activity or motion, the biometric monitoring device may place the motion sensor(s) into a higher sampling rate and/or higher sampling resolution mode to, for example, enable more accurate adaptive filtering of the heart rate signal.

Figure 9:
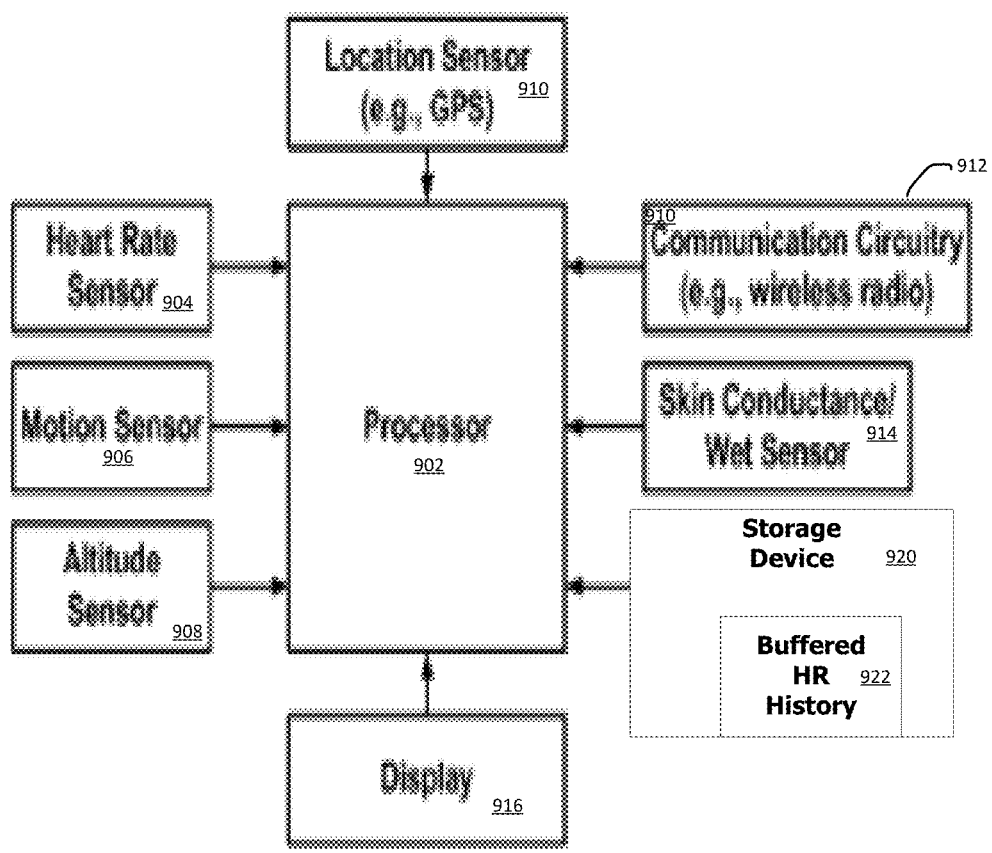
FIG. 9 is a block diagram of exemplary components that may be included in the heartrate capture device of FIG. 8A and FIG. 8B.

FIG. 9 is a block diagram of exemplary components that may be included in a fitness tracker 900 such as that of FIG. 8, including a processor 902, a heart rate sensor 904, a motion sensor 906, an altitude sensor 908, a location sensor (e.g. GPS) 910, communication circuitry 912, a skin conductance sensor 914 a display controller 916 and a store device 920 comprising a buffered heartrate history 922. Depending upon the communication capabilities of the fitness tracker 900, the buffered heartrate history 922 may be forwarded either to an application of a connected device (such as a cell phone or the like) or may be forwarded directly to the authentication server.

Figure 10:
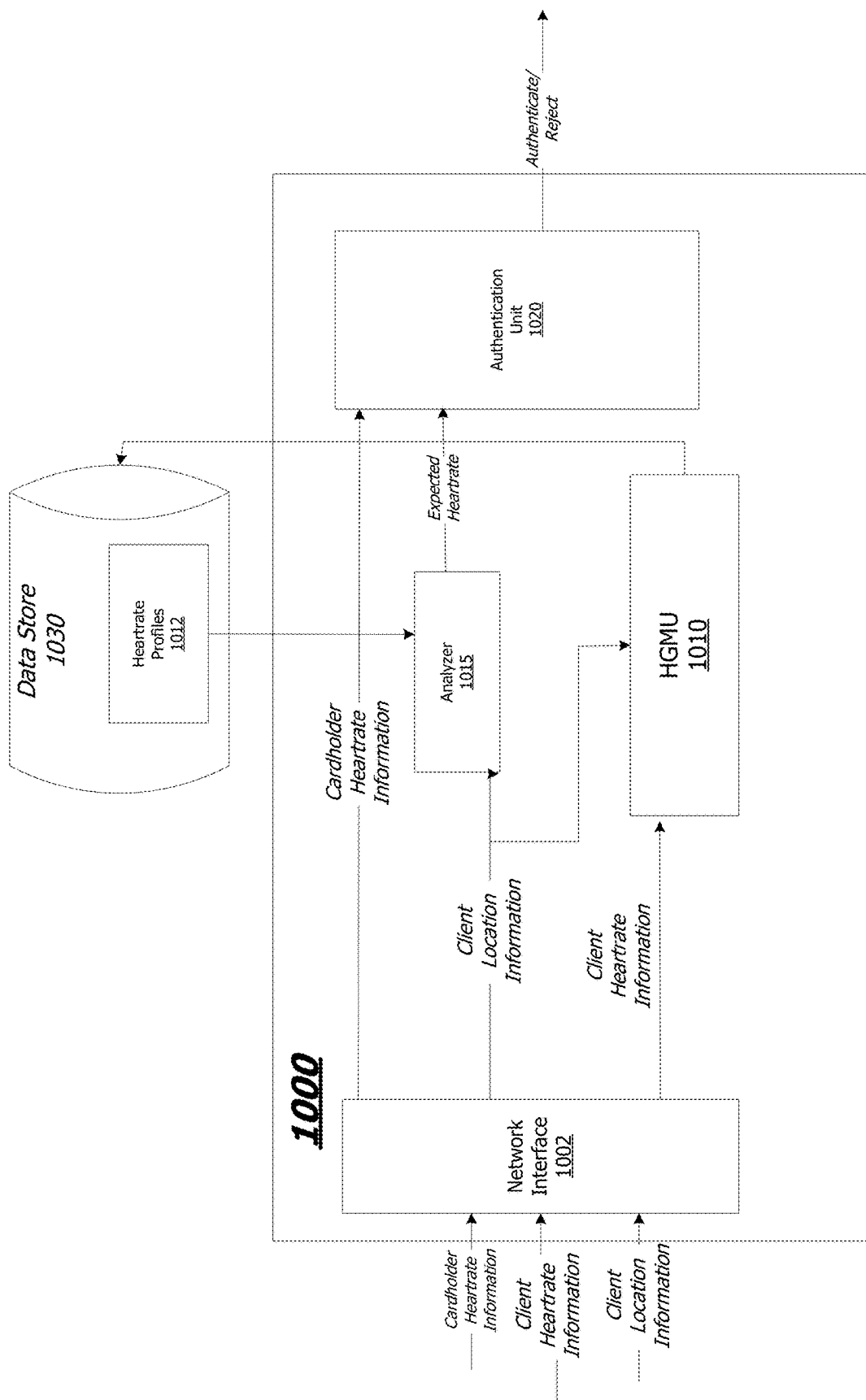
FIG. 10 is a block diagram of exemplary components that may be included in an authentication server for performing biometric heartrate authentication as disclosed herein.

FIG. 10 illustrates various components that may be included in one embodiment of a biometric heartrate authentication server 1000. The components include a network interface 1002, a heartrate profile generation/maintenance Unit (HGMU) 1010, an analyzer 1015 and an authentication unit 1020. A data store 1030 is shown communicatively coupled to the authentication server 1000 and is shown to store a plurality of heartrate profiles 1012 corresponding to a plurality of clients having accounts maintained by the service provider.

As described above, the network interface 1002 may be configured to receive cardholder heartrate information, client heartrate information and client location information. The client heartrate information and client location information may be used by the HGMU 1010 for initial population of the heartrate profiles as described with regard to FIG. 3. Upon receipt of an access request, the analyzer 1015 may compute an expected heartrate in response to the client location information and client heartrate profile. The expected heartrate is compared by authentication unit 1020 against the cardholder heartrate and an authenticate or reject authentication signal may be returned to the transaction device. As described above, in one embodiment the expected heartrate may comprise a range of heartrates, and if the cardholder heartrate falls within the range of heartrates, it corresponds to the expected heartrate. If it does not fall within the range, and is inconsistent with the expected heartrate, then the request is rejected.

According a biometric heartrate authentication system and method has been shown and described that leverages heartrate information collected by heartrate tracking devices together with location information obtained from client devices to build a heartrate profile for a client and validate access requests based on the heartrate profile and location information uniquely associated with a client, thereby providing a low cost, non-invasive method for reliably authenticating individuals and securing against fraudulent account accesses.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:

capturing, by a plurality of heartrate monitoring devices, real-time heartrate information for a plurality of clients of a service provider;

building, by a server in response to receiving the real-time heartrate information from the plurality of heartrate monitoring devices, a heartrate profile for each client, the heartrate profile comprising, for each client, a baseline heartrate and a plurality of exertion variances, each exertion variance associated with one of a plurality of modes of client transportation, each exertion variance comprising a range of heartrate values and a recovery period for the client associated with the corresponding mode of client transportation, the recovery period corresponding to an amount of time for a client heartrate having the respective exertion variance to return to the associated baseline heartrate following the client engaging in the corresponding mode of client transportation;

receiving, by the server from a transaction terminal, a request to authenticate access to an account maintained by the service provider, the request comprising a token and a heartrate of a cardholder issuing the request, wherein the heartrate of the cardholder is captured by at least one of the plurality of heartrate monitoring devices;

retrieving, by the server, the heartrate profile for a first client associated with the account, the first client one of the plurality of clients;

retrieving, by the server, an activity profile for the first client associated with the account, the activity profile comprising location information over time for the first client;

determining, for the cardholder by a machine learning (ML) model executing on the server, a first mode of client transportation of the plurality of modes of client transportation and that the first client is within the recovery period corresponding to the first mode of client transportation, wherein the ML model is trained based on training data comprising location data and heartrate data for a plurality of users;

determining, by the ML model based on the determined first mode of client transportation, the range of heartrate values of a first exertion variance of the plurality of exertion variances corresponding to the first mode of client transportation based on the heartrate profile of the first client;

based on the determination that the first client is within the recovery period corresponding to the first mode of client transportation, the determined range of heartrate values of the first exertion variance, and the determined recovery period of the first exertion variance applied to the baseline heartrate of the heartrate profile of the first client, determining, by the ML model, an expected range of heartrate values for the first client;

determining, by the ML model, that the heartrate of the cardholder is not within the expected range of heartrate values for the first client;

rejecting, by the server, the requested access to the account based on the determination that the heartrate of the cardholder is not within the expected range of heartrate values for the first client; and rejecting, by the server, a transaction for the account based on the rejection of the requested access to the account by the cardholder.

2. The method of claim 1, wherein the server rejects the transaction as being fraudulent, wherein each exertion variance is associated with a change in heartrate over a corresponding baseline heartrate for a corresponding mode of transportation, wherein the plurality of heartrate monitoring devices include: (i) one or more smart watches, and (ii) one or more wearable fitness trackers.

3. The method of claim 2, wherein the activity profile of the first client comprises a plurality of location information related to a location of the first client during a corresponding plurality of time intervals.

4. The method of claim 3, wherein the mode of transportation includes walking, driving, biking, standing, running or a combination thereof.

5. The method of claim 4, further comprising:

requesting, by the server based on rejecting the requested authentication, additional authentication from the first client;

receiving, by the server, the additional authentication from the first client;

authenticating, by the server, the requested access to the account based on the additional authentication; and processing, by the server, the transaction for the account based on the authentication.

6. The method of claim 5, further comprising:

denying access to the cardholder by the server in response to a determination that the heartrate of the cardholder is outside the expected range of heartrate values for the first client.

7. The method of claim 1, further comprising:

analyzing, by the server, the location information to determine variations in a rate of travel of the cardholder;

attributing, by the server, a plurality of modes of transportation to the cardholder in response to the variations in the rate of travel; and associating, by the server, the range of heartrate values of the exertion variance with the corresponding mode of travel.

8. The method of claim 7, wherein the token is provided by a card or a transmitting device, and wherein the token is presented to the transaction terminal by one of insertion of the card, swiping of the card, or by network communication with the transmitting device.

9. A system, comprising:

a processor; and a memory storing instructions which when executed by the processor cause the processor to perform the steps of:

capturing, by a plurality of heartrate monitoring devices, real-time heartrate information for a plurality of clients of a service provider;

building, by a server in response to the captured real-time heartrate information, a heartrate profile for each client, the heartrate profile comprising, for each client, a baseline heartrate and a plurality of exertion variances, each exertion variance associated with one of a plurality of modes of client transportation, each exertion variance comprising a range of heartrate values and a recovery period for the client associated with the corresponding mode of client transportation, the recovery period corresponding to an amount of time for a client heartrate having the respective exertion variance to return to the associated baseline heartrate following the client engaging in the corresponding mode of client transportation;

receiving, by the server from a transaction terminal, a request to authenticate access to an account maintained by the service provider, the request comprising a token and a heartrate of a cardholder issuing the request, wherein the heartrate of the cardholder is captured by at least one of the plurality of heartrate monitoring devices;

retrieving, by the server, the heartrate profile for a first client associated with the account, the first client one of the plurality of clients;

retrieving, by the server, an activity profile for the first client associated with the account, the activity profile comprising location information over time for the first client;

determining, for the cardholder by a machine learning (ML) model executing on the server, a first mode of client transportation of the plurality of modes of client transportation and that the first client is within the recovery period corresponding to the first mode of client transportation, wherein the ML model is trained based on training data comprising location data and heartrate data for a plurality of users;

determining, by the ML model based on the determined first mode of client transportation, the range of heartrate values of a first exertion variance of the plurality of exertion variances corresponding to the first mode of client transportation based on the heartrate profile of the first client;

based on the determination that the first client is within the recovery period corresponding to the first mode of client transportation, the determined range of heartrate values of the first exertion variance, and the determined recovery period of the first exertion variance applied to the baseline heartrate of the heartrate profile of the first client, determining, by the ML model, an expected range of heartrate values for the first client;

determining, by the ML model, that the heartrate of the cardholder is not within the expected range of heartrate values for the first client;

rejecting, by the server, the requested access to the account based on the determination that the heartrate of the cardholder is not within the expected range of heartrate values for the first client; and rejecting, by the server, a transaction for the account based on the rejection of the requested access to the account by the cardholder.

10. The system of claim 9, wherein each exertion variance is associated with a change in heartrate over a corresponding baseline heartrate for a corresponding mode of transportation, wherein the plurality of heartrate monitoring devices include: (i) one or more smart watches, and (ii) one or more wearable fitness trackers.

11. The system of claim 10, wherein the activity profile of the first client comprises a plurality of location information related to a location of the first client during a corresponding plurality of time intervals.

12. The system of claim 11, wherein the mode of transportation includes walking, driving, biking, standing, running or a combination thereof.

13. A non-transitory computer-readable storage medium storing computer-readable program code that when executed by a processor cause the processor to perform the steps of:

capturing, by a plurality of heartrate monitoring devices, real-time heartrate information for a plurality of clients of a service provider;

building, by a server in response to the captured real-time heartrate information, a heartrate profile for each client, the heartrate profile comprising, for each client, a baseline heartrate and a plurality of exertion variances, each exertion variance associated with one of a plurality of modes of client transportation, each exertion variance comprising a range of heartrate values and a recovery period for the client associated with the corresponding mode of client transportation, the recovery period corresponding to an amount of time for a client heartrate having the respective exertion variance to return to the associated baseline heartrate following the client engaging in the corresponding mode of client transportation;

receiving, by the server from a transaction terminal, a request to authenticate access to an account maintained by the service provider, the request comprising a token and a heartrate of a cardholder issuing the request, wherein the heartrate of the cardholder is captured by at least one of the plurality of heartrate monitoring devices;

retrieving, by the server, the heartrate profile for a first client associated with the account, the first client one of the plurality of clients;

retrieving, by the server, an activity profile for the first client associated with the account, the activity profile comprising location information over time for the first client;

determining, for the cardholder by a machine learning (ML) model executing on the server, a first mode of client transportation of the plurality of modes of client transportation and that the first client is within the recovery period corresponding to the first mode of client transportation, wherein the ML model is trained based on training data comprising location data and heartrate data for a plurality of users;

determining, by the ML model based on the determined first mode of client transportation, the range of heartrate values of a first exertion variance of the plurality of exertion variances corresponding to the first mode of client transportation based on the heartrate profile of the first client;

based on the determination that the first client is within the recovery period corresponding to the first mode of client transportation, the determined range of heartrate values of the first exertion variance, and the determined recovery period of the first exertion variance applied to the baseline heartrate of the heartrate profile of the first client, determining, by the ML model, an expected range of heartrate values for the first client;

determining, by the ML model, that the heartrate of the cardholder is not within the expected range of heartrate values for the first client;

rejecting, by the server, the requested access to the account based on the determination that the heartrate of the cardholder is not within the expected range of heartrate values for the first client; and rejecting, by the server, a transaction for the account based on the authentication of the requested access to the account by the cardholder.

14. The medium of claim 13, wherein each exertion variance is associated with a change in heartrate over a corresponding baseline heartrate for a corresponding mode of transportation, wherein the plurality of heartrate monitoring devices include: (i) one or more smart watches, and (ii) one or more wearable fitness trackers.

15. The medium of claim 14, wherein the activity profile of the first client comprises a plurality of location information related to a location of the first client during a corresponding plurality of time intervals.

16. The medium of claim 15, wherein the mode of transportation includes walking, driving, biking, standing, running or a combination thereof.

17. The method of claim 1, wherein the ML model is trained to associate heartrate values with one or more of the plurality of modes of client transportation based on the training data.

18. The system of claim 9, wherein the ML model is trained to associate heartrate values with one or more of the plurality of modes of client transportation based on the training data.

19. The medium of claim 13, wherein the ML model is trained to associate heartrate values with one or more of the plurality of modes of client transportation based on the training data.

\* \* \* \* \*